US010169731B2

(12) United States Patent
Brew et al.

(10) Patent No.: US 10,169,731 B2
(45) Date of Patent: Jan. 1, 2019

(54) SELECTING KEY PERFORMANCE INDICATORS FOR ANOMALY DETECTION ANALYTICS

(71) Applicant: International Business Machines Corporation, Armonk, NY (US)

(72) Inventors: Anthony T. Brew, Dublin (IE); Ryan A. Garrett, Toronto (CA); Robert J. McKeown, Newburyport, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 490 days.

(21) Appl. No.: 14/929,982

(22) Filed: Nov. 2, 2015

(65) Prior Publication Data
US 2017/0124502 A1     May 4, 2017

(51) Int. Cl.
G06Q 10/06     (2012.01)
H04L 29/08     (2006.01)
H04L 29/06     (2006.01)

(52) U.S. Cl.
CPC ....... *G06Q 10/06393* (2013.01); *H04L 67/06* (2013.01); *H04L 67/2819* (2013.01); *H04L 67/303* (2013.01); *H04L 67/42* (2013.01)

(58) Field of Classification Search
CPC ......... G06Q 10/00; G06Q 40/00; G06F 17/60
(Continued)

(56) References Cited

U.S. PATENT DOCUMENTS

| 7,831,464 B1 * | 11/2010 | Nichols ............... G06F 11/3409 |
| | | 705/7.39 |
| 8,458,090 B1 * | 6/2013 | Batra .................... G06Q 99/00 |
| | | 705/325 |

(Continued)

FOREIGN PATENT DOCUMENTS

WO     2014200458     12/2014

OTHER PUBLICATIONS

IEEE "A Simple Iterative Gaussian Detector for Severely DelaySpread MIMO Channels", Browse Conferences > Communications, 2007. ICC '07., pp. 1-13 (Year: 2007).*

(Continued)

*Primary Examiner* — Romain Jeanty
(74) *Attorney, Agent, or Firm* — Cantor Colburn LLP; Richard Wilhelm

(57) ABSTRACT

A computer program product is provided and includes a storage medium having program instructions. The program instructions are readable and executable by a processing circuit to cause the processing circuit to determine from historical data which anomaly detectors are associated with key performance indicators (KPIs), to extract descriptors of the first metric group from the KPIs to create a first feature profile thereof, to repeat the determining and the extracting with respect to historical data of second and third metric groups to create second and third feature profiles thereof, respectively, to ascertain which of the second and third feature profiles has a greater correlation to the first feature profile and to rank the second and third feature profiles based on which one has the greater correlation and compare the higher ranked one to future metrics in current or subsequent environments to determine if specific KPIs are likely to produce anomalies.

17 Claims, 5 Drawing Sheets

(58) Field of Classification Search
USPC .......................................................... 705/7.11
See application file for complete search history.

(56) References Cited

U.S. PATENT DOCUMENTS

| | | | |
|---|---|---|---|
| 2009/0248722 A1 | 10/2009 | Pikovsky | |
| 2012/0051642 A1* | 3/2012 | Berrani | G06T 1/0028 382/180 |
| 2013/0110761 A1* | 5/2013 | Viswanathan | G06N 99/005 706/52 |
| 2013/0151907 A1* | 6/2013 | Nakagawa | G06F 11/3452 714/47.1 |
| 2014/0280142 A1 | 9/2014 | Wasson | |
| 2016/0103838 A1* | 4/2016 | Sainani | G06F 3/0488 707/725 |
| 2016/0147585 A1* | 5/2016 | Konig | G06F 11/3419 714/37 |

OTHER PUBLICATIONS

List of IBM Patents or Patent Applications Treated as Related; (Appendix P), Filed Jan. 11, 2016; 2 pages.
Ryan A. Garrett, et al., "Selecting Time-Series Data for Information Technology (IT) Operations Analytics Anomaly Detection", U.S. Appl. No. 14/862,395, filed Sep. 23, 2015.

\* cited by examiner

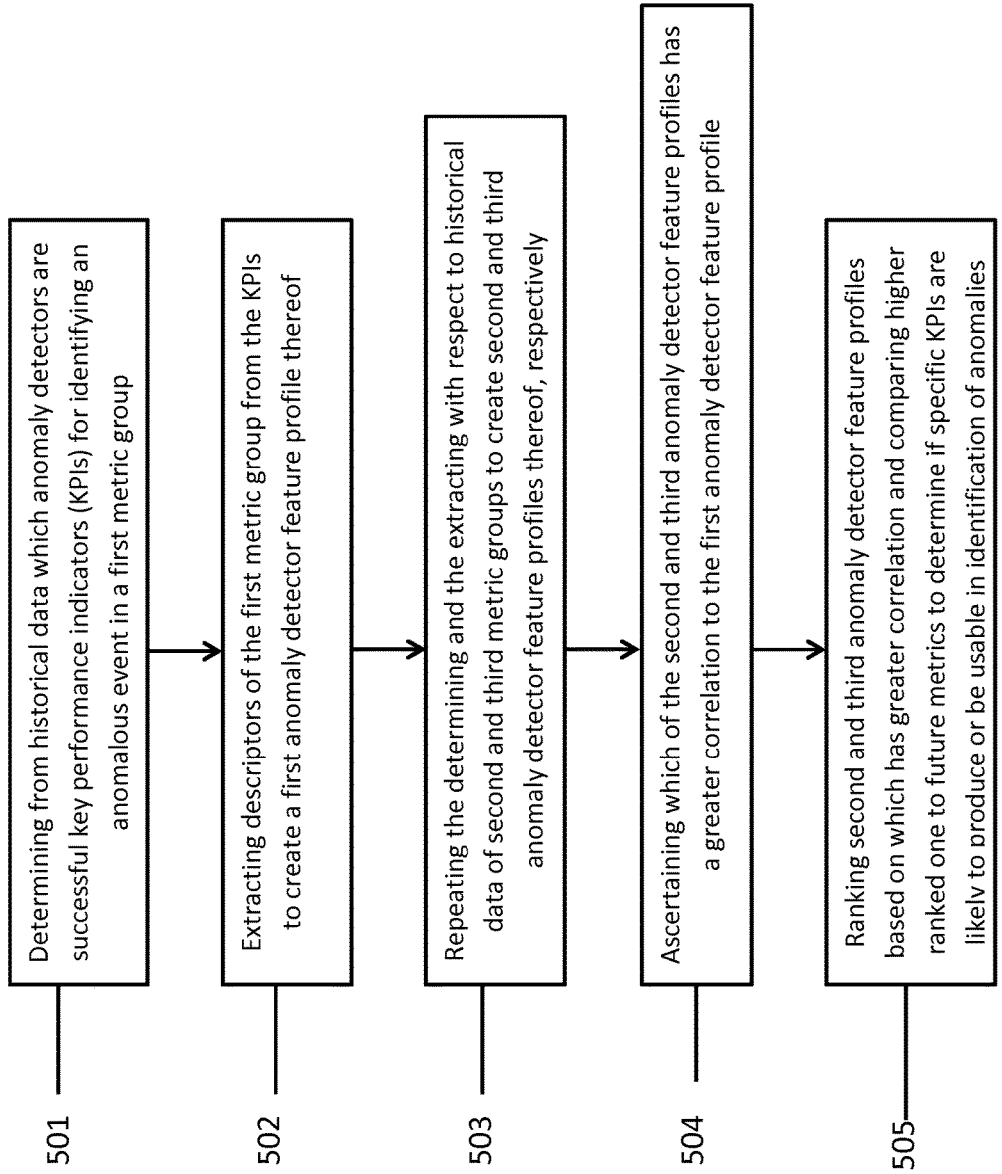

SELECTING KEY PERFORMANCE INDICATORS FOR ANOMALY DETECTION ANALYTICS

BACKGROUND

The present invention relates to key performance indicator selection and, more specifically, to the selection of key performance indicators for anomaly detection analytics.

In order to maintain or secure mission-critical systems, businesses often rely on monitoring systems that can help predict, detect and/or diagnose problems. However, when incidents occur in a complex production environment, it takes a tremendous amount of effort to investigate and determine the root causes of those incidents based on information provided by the monitoring system in use. For instance, a subject matter expert might need to analyze data related to metrics involved in an incident over a time period and for any given anomaly a large amount of effort can go into building up the pattern of metrics that helps an administrator understand and address the situation at hand.

Presently, the solution is complex and requires the writing of rules or situations such as those found in products, such as the IBM Tivoli Network Manager (ITMN). There, the approach is to build a situation from a series of rules (e.g., if CPU usage goes above X and memory usage drops below Y within time period Z, then raise an alarm). This type of solution involves a significant amount of manual encoding/rule writing and can be error prone and seen as a common source of pain to users. Thus, in many organizations, it has become common to "metricize" applications to enabling monitoring and this has led to an explosion in the number of possible metrics and the different systems from which these metrics can be monitored. It therefore has also become practically impossible and infeasible to write rules for the quantity of metrics that are available.

Solutions, such as smart cloud analytics predictive insights, aim to address the problem of metricized applications by applying large scale data mining techniques to automate the "rule writing" for users. Automated rule writing results in subsets of key performance indicators (KPIs), which involve metrics that are typically organized into groups, to be selected at a group-level granularity at an entry point to the system and at stage known as mediation. The KPI organization might be, at the metric level (e.g., "Response Time") or at the resource level (e.g., "Response Time on WebSphere Servers").

SUMMARY

According to an embodiment of the present invention, a computer program product for selecting key performance indicators is provided. The computer program product includes a computer readable storage medium having program instructions embodied therewith. The program instructions are readable and executable by a processing circuit to cause the processing circuit to determine from historical data which anomaly detectors are associated with key performance indicators (KPIs) for identifying an anomalous event in a first metric group, to extract descriptors of the first metric group from the KPIs to create a first anomaly detector feature profile thereof, to repeat the determining and the extracting with respect to historical data of second and third metric groups to create second and third anomaly detector feature profiles thereof, respectively, to ascertain which of the second and third anomaly detector feature profiles has a greater correlation to the first anomaly detector feature profile and to rank the second and third anomaly detector feature profiles based on which one has the greater correlation and compare the higher ranked one to future metrics in current or subsequent environments to determine if specific KPIs are likely to produce anomalies.

According to another embodiment of the present invention, a computer system for selecting key performance indicators is provided. The computer system includes a computer readable storage medium having instructions stored thereon that are executable by a processing circuit to cause the processing circuit to determine from historical data which anomaly detectors are associated with key performance indicators (KPIs) for identifying an anomalous event in a first metric group, extract descriptors of the first metric group from the KPIs to create a first anomaly detector feature profile thereof, repeat the determining and the extracting with respect to historical data of second and third metric groups to create second and third anomaly detector feature profiles thereof, respectively, ascertain which of the second and third anomaly detector feature profiles has a greater correlation to the first anomaly detector feature profile and rank the second and third anomaly detector feature profiles based on which one has the greater correlation and compare the higher ranked one to future metrics in current or subsequent environments to determine if specific KPIs are likely to produce anomalies.

According to yet another embodiment of the present invention, a computer-implemented method for selecting key performance indicators is provided. The computer-implemented method includes determining from historical data which anomaly detectors are associated with key performance indicators (KPIs) for identifying an anomalous event in a first metric group, extracting descriptors of the metric group from the KPIs to create a first anomaly detector feature profile thereof, repeating the determining and the extracting with respect to historical data of second and third metric groups to create second and third anomaly detector feature profiles thereof, respectively, ascertaining which of the second and third anomaly detector feature profiles has a greater correlation to the first anomaly detector feature profile and ranking the second and third anomaly detector feature profiles based on which one has the greater correlation and comparing the higher ranked one to future metrics in current or subsequent environments to determine if specific KPIs are likely to produce anomalies.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 5 is a flow diagram illustrating a computer-implemented method for selecting key performance indicators in accordance with embodiments.

DETAILED DESCRIPTION

As will be described below, a computer program product, a system and a computer-implemented method are provided to enable the selection of KPIs to provide optimal value to users given a known set of deployable anomaly detectors and the environment or technical domain into which the computer program product, the system and the computer-implemented method are deployed. The deployable anomaly detectors may include, but are not limited to, detectors that detect large deviations from an expected Gaussian behavior, detectors that detect sudden halts or flat lines, detectors that detect slow leaks or drifts upwards and detectors that detect slow degradation or drifts downwards. Other anomaly detectors are, of course, possible and are included in the scope of this description. The environment or technical domain may include, but are not limited to, telecommunications and banking environments.

Figure 1:
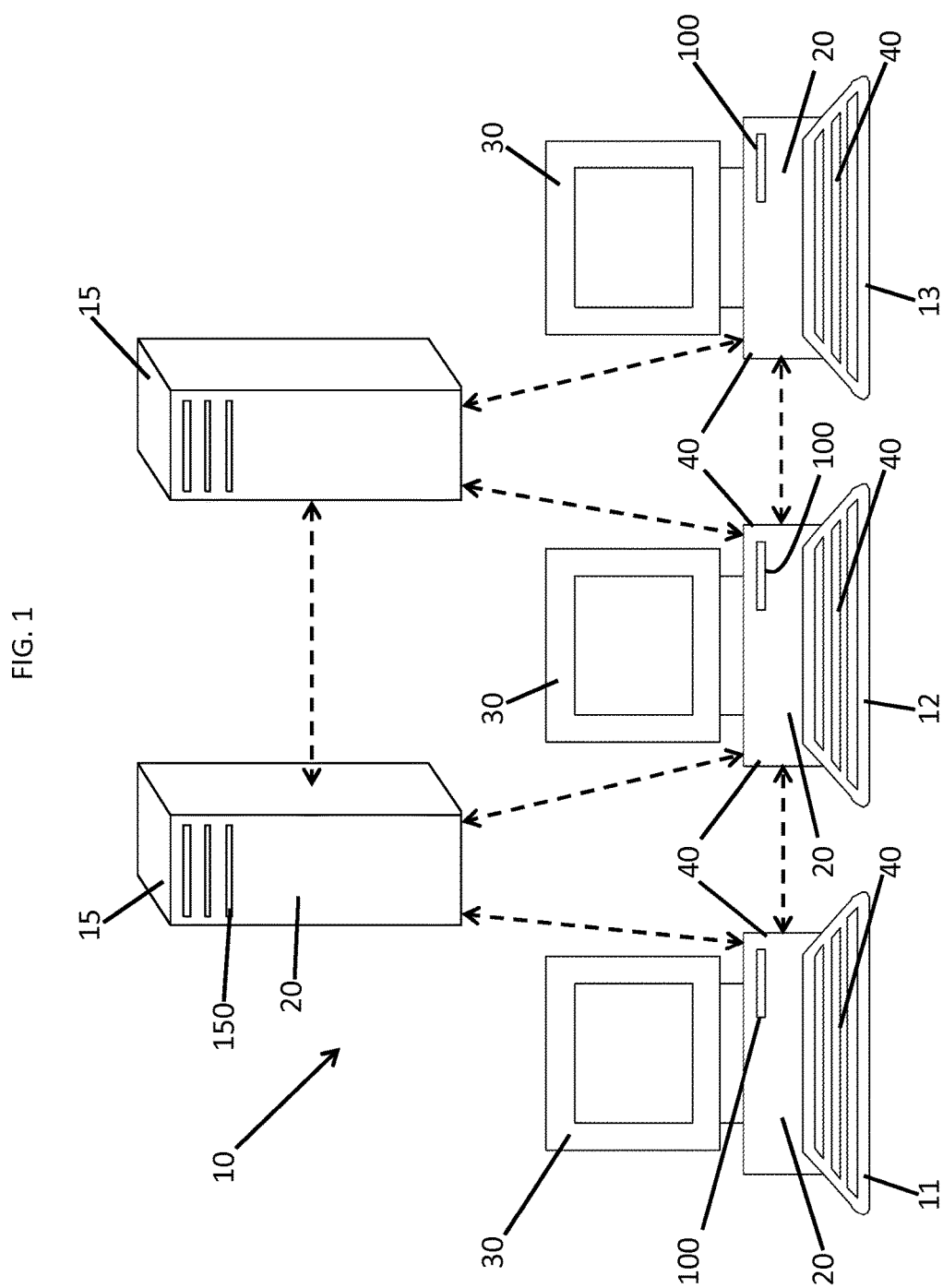
FIG. 1 is a schematic diagram of a first computing system in accordance with embodiments.

With reference to FIG. 1, a first computing system 10 is provided and may be configured for example as an enterprise computing system or as a personal computing system. In either case, the first computing system 10 includes first, second and third computing devices 11, 12 and 13 and servers 15 which are configured to be networked together for communication purposes. Each of the first, second and third computing devices 11, 12 and 13 and the servers 15 may include among other features a processing circuit 20, a display 30, user input devices 40 and a networking unit 50 as well as a computer program product 100 for selecting key performance indicators (KPIs). The processing circuit 20 may be provided as a micro-processor, a central processing unit (CPU) or any other suitable processing device. The display 30 may be provided as a monitor and is configured to display data and information as well as a graphical user interface to an administrator or user. The user input devices 40 may be provided as a mouse and a keyboard combination and are configured to allow the administrator or user to input commands to the processing circuit 20. The networking unit 50 may be provided as an Ethernet or other suitable networking device by which the first, second and third computing devices 11, 12 and 13 and servers 15 are communicative.

Figure 2:
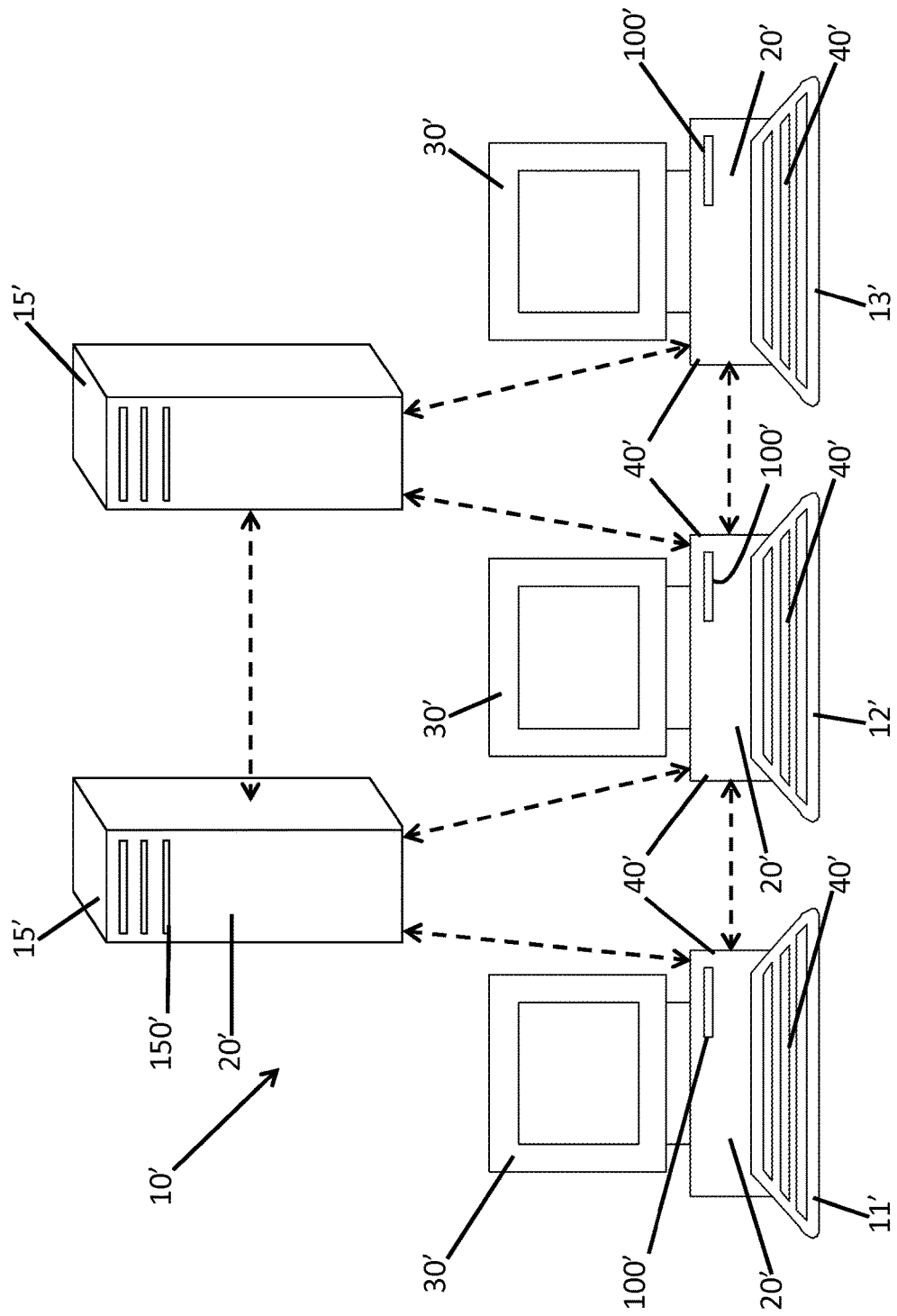
FIG. 2 is a schematic diagram of a second computing system in accordance with embodiments.

With reference to FIG. 2, a second computing system 10' is provided and may be configured for example as an enterprise computing system or as a personal computing system. In either case, the first computing system 10' includes first, second and third computing devices 11', 12' and 13' and servers 15' which are configured to be networked together for communication purposes. Each of the first, second and third computing devices 11', 12' and 13' and the servers 15' may include among other features a processing circuit 20', a display 30', user input devices 40' and a networking unit 50.' The processing circuit 20' may be provided as a micro-processor, a central processing unit (CPU) or any other suitable processing device. The display 30' may be provided as a monitor and is configured to display data and information as well as a graphical user interface to an administrator or user. The user input devices 40' may be provided as a mouse and a keyboard combination and are configured to allow the administrator or user to input commands to the processing circuit 20'. The networking unit 50' may be provided as an Ethernet or other suitable networking device by which the first, second and third computing devices 11', 12' and 13' and servers 15' are communicative.

Figure 3:
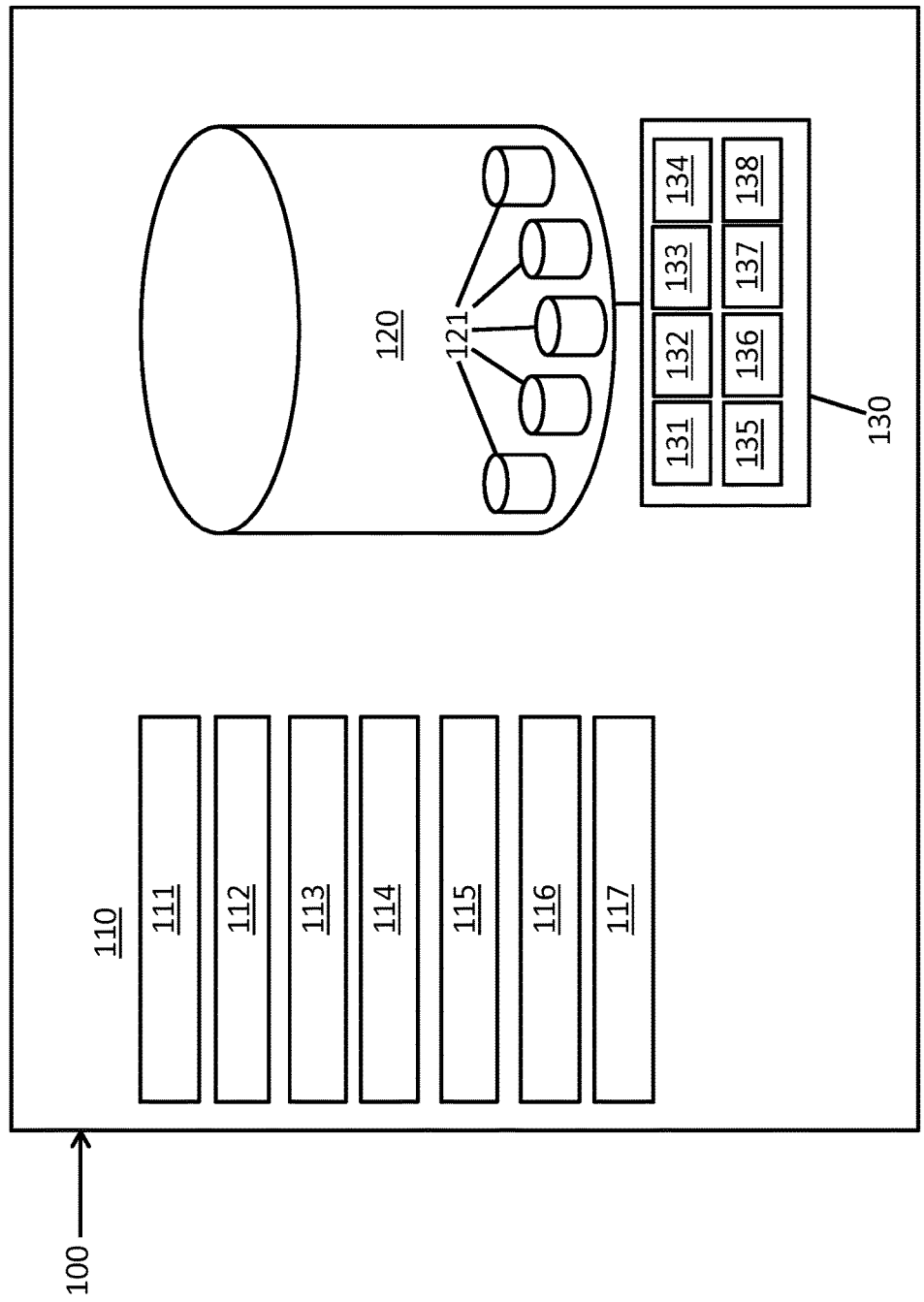
FIG. 3 is a schematic diagram of a computer program product of the computing system of FIG. 1 in accordance with embodiments.

With reference to FIG. 3, the computer program product 100 includes a computer readable storage medium 110 and may be installed in a memory unit 150 of one of the servers 15 (see FIG. 1) or any of the first, second and third computing devices 11, 12 and 13. For clarity and brevity, the following description will relate to only the case where the computer readable storage medium 110 of the computer program product 100 is installed in the memory unit 150 of the one of the servers 15 although it is to be understood that this configuration is merely exemplary and is not intended to be limiting of the disclosure in any way.

The computer program product 100 further includes a historical time-series database 120, in which historical time-series data is grouped into multiple metric groups 121, and a plurality of anomaly detectors 130. Each metric group 121, such as a central processing unit (CPU) utilization metric group, is made up of time-series data sets from different hosts in a distributed environment (i.e., the first, second and third computing devices 11, 12 and 13 in the first computing system 10). The anomaly detectors 130 may be provided with access to the multiple metric groups 121 of the historical time-series database and may include, but are not limited to, a Gaussian detector 131, a flat line detector 132, an increased variance detector 133, a de-correlation detector 134, a top out detector 135, a bottom out detector 136, a stop reporting detector 137 and a start reporting detector 138.

In accordance with embodiments, the Gaussian detector 131 generates an alarm for a given metric group 121 when the corresponding data exhibits, for example, a greater than three-sigma deviations. The flat line detector 132 generates an alarm for a given metric group 121 when the corresponding data flattens or reports a same value for an extended period of time. The increased variance detector 133 generates an alarm for a given metric group 121 when the corresponding data exhibits an increased tendency to vary from a baseline value. The de-correlation detector 134 generates an alarm for a given metric group 121 when the corresponding data exhibits a de-correlation with respect to data of another metric group 121. The top out detector 135 generates an alarm for a given metric group 121 when the corresponding data achieves a maximum value and then does not recede from that maximum value. The bottom out detector 136 generates an alarm for a given metric group 121 when the corresponding data achieves a minimum value and then does increase from that minimum value. The stop reporting detector 137 generates an alarm for a given metric group 121 when a metric group 121 that is normally online goes offline and the start reporting detector 138 generates an alarm for a given metric group 121 when a metric group 121 that is normally online goes offline.

The computer readable storage medium 110 has first, second, third and fourth program instructions 111, 112, 113 and 114 stored thereon. The first program instructions 111 are executable by the processing circuit 20 of the server 15 to cause the processing circuit 20 to determine from the historical time-series data which ones or more of the anomaly detectors 130 are associated with or produce from their respective operations key performance indicators (KPIs) for identifying an anomalous event in a first one of the metric groups 121 (hereinafter referred to as "first metric group 121"). The second program instructions 112 are executable by the processing circuit 20 of the server 15 to cause the processing circuit 20 to extract descriptors of the first metric group 121 from the KPIs to create a first anomaly detector feature profile thereof. The third program instructions 113 are executable by the processing circuit 20 to cause the processing circuit 20 (or the processing circuit 20' of the server 15' of the second computing system 10') to repeat the determining and the extracting with respect to historical data of second and third metric groups 121/121' to create second and third anomaly detector feature profiles thereof, respectively. The fourth program instructions 114 executable by the processing circuit 20 to cause the processing circuit 20 (or the processing circuit 20' of the server 15' of the second computing system 10') to ascertain which of the second and third anomaly detector feature profiles has a greater correlation to the first anomaly detector feature profile.

The computer readable storage medium 110 also has fifth program instructions 115 stored thereon and may have sixth and seventh program instructions 116 and 117 stored thereon. The fifth program instructions 115 cause the processing unit 20 to rank the second and third anomaly detector feature profiles based on which one has the greater correlation and compare the higher ranked one to future metrics in current or subsequent environments to determine if specific KPIs are likely to produce or to be usable in the identification of anomalies.

The sixth program instructions 116 cause the processing unit 20 to deploy the one of the second and third metric groups 121/121' whose anomaly detector feature profile has a greater correlation to the first anomaly detector feature profile. The seventh program instructions 117 are executable by the processing circuit 20 to cause the processing circuit 20 to update the first anomaly detector feature profile. More particularly, the seventh program instructions 117 may be executable by the processing circuit 20 to cause the processing circuit 20 to update the first anomaly detector feature profile based on a performance of the deployed one of the second and third metric groups 121/121'. In the latter case, the computer readable storage medium 110 may be installed in and deployed from the memory unit 150 of the server 15 of the first computing system 10 or the memory unit 150' of the server 15' of the second computing system 10'.

The second and third metric groups 121 may be made up of time-series data sets from same or different hosts in a distributed environment, such as the first, second and third computing devices 11, 12 and 13 in the first computing system 10. Alternatively, the second and third metric groups 121' may be made up of time-series data sets from different hosts in a distributed environment, such as the first, second and third computing devices 11', 12' and 13' in the second computing system 10'. In the latter case, the In an exemplary deployment, let it be assumed that the Gaussian detector 131 and the flat line detector 132 are active and given access to the historical time-series data associated with the first metric group 121 and that the first metric group 121 relates to CPU utilization in the first computing system 10. Here, the execution of the first program instructions 111 may leads to a first determination that 10% of the metrics of the first metric group 121 generated an alarm on the Gaussian detector 131 and that 3% of the metrics of the first metric group 121 generated an alarm on the flat line detector 132 and to a second determination that the generated alarms on the Gaussian and flat line detectors 131 and 132 sufficiently identifies an anomalous event in the second computing system 10. Based on these determinations, the execution of the second program instructions 112 leads to an extraction of a (10, 3) descriptor of the first metric group 121 (i.e., a first anomaly detector feature profile).

Subsequently, by executing the third program instructions 113 on the second and third metric groups 121/121', second and third feature profiles thereof may be respectively created even if the second and third metric groups 121/121' are groups that have not yet been seen or considered. That is, it may be determined that the second metric group 121/121' has a (10, 4) second anomaly detector feature profile since 10% of its metrics generate an alarm on the Gaussian detector 131 and 4% of its metrics generate an alarm on the flat line detector 132. Similarly, it may be determined that the third metric group 121/121' has a (30, 20) third anomaly detector feature profile since 30% of its metrics generate an alarm on the Gaussian detector 131 and 20% of its metrics generate an alarm on the flat line detector 132.

Thus, since the second anomaly detector feature profile of the second metric group 121/121' has a greater correlation to the (10, 3) descriptor of the first anomaly detector feature profile than that of the third metric group 121/121', by way of execution of the fourth, fifth and sixth program instructions 114, 115 and 116, it may be ascertained that the second anomaly detector feature profile has a greater correlation to the first anomaly detector feature profile and is to be deployed for identification of future anomalous events in the first computing system 10 or the second computing system 10'. That is, given a higher degree of correlation between KPI metric groups, features from detectors and anomalies, a profile of the KPI group is assigned and ranked. This generated profile of KPI metric groups is then compared to future metrics either in the current environment or in subsequent environments to determine if specific KPIs are likely to produce or be usable in the identification of anomalies.

While it is understood that the first-seventh program instructions 111-117 may be deployed by manual loading thereof directly into a client, server and/or proxy computer by way of a loadable storage medium, such as a CD, DVD, etc., or by being manually inserted into each of the first, second and third computing devices 11, 12 and 13 and the servers 15, the first-seventh program instructions 111-117 may also be automatically or semi-automatically deployed into the first computing system 10 and the second computing system 10' by way of the servers 15 and 15'. In such cases, the first-seventh program instructions 111-117 may be downloadable into client computers that will then execute the first-seventh program instructions 111-117.

In accordance with alternative embodiments, the first-seventh program instructions 111-117 may be sent directly to a client system via e-mail with the first-seventh program instructions 111-117 then being detached to or loaded into a directory. Another alternative would be that the first-seventh program instructions 111-117 be sent directly to a directory on a client computer hard drive. When there are proxy servers, however, loading processes will select proxy server codes, determine on which computers to place the proxy servers' codes, transmit the proxy server codes and then install the proxy server codes on proxy computers. The first-seventh program instructions 111-117 will then be transmitted to the proxy server and subsequently stored thereon.

Figure 4:
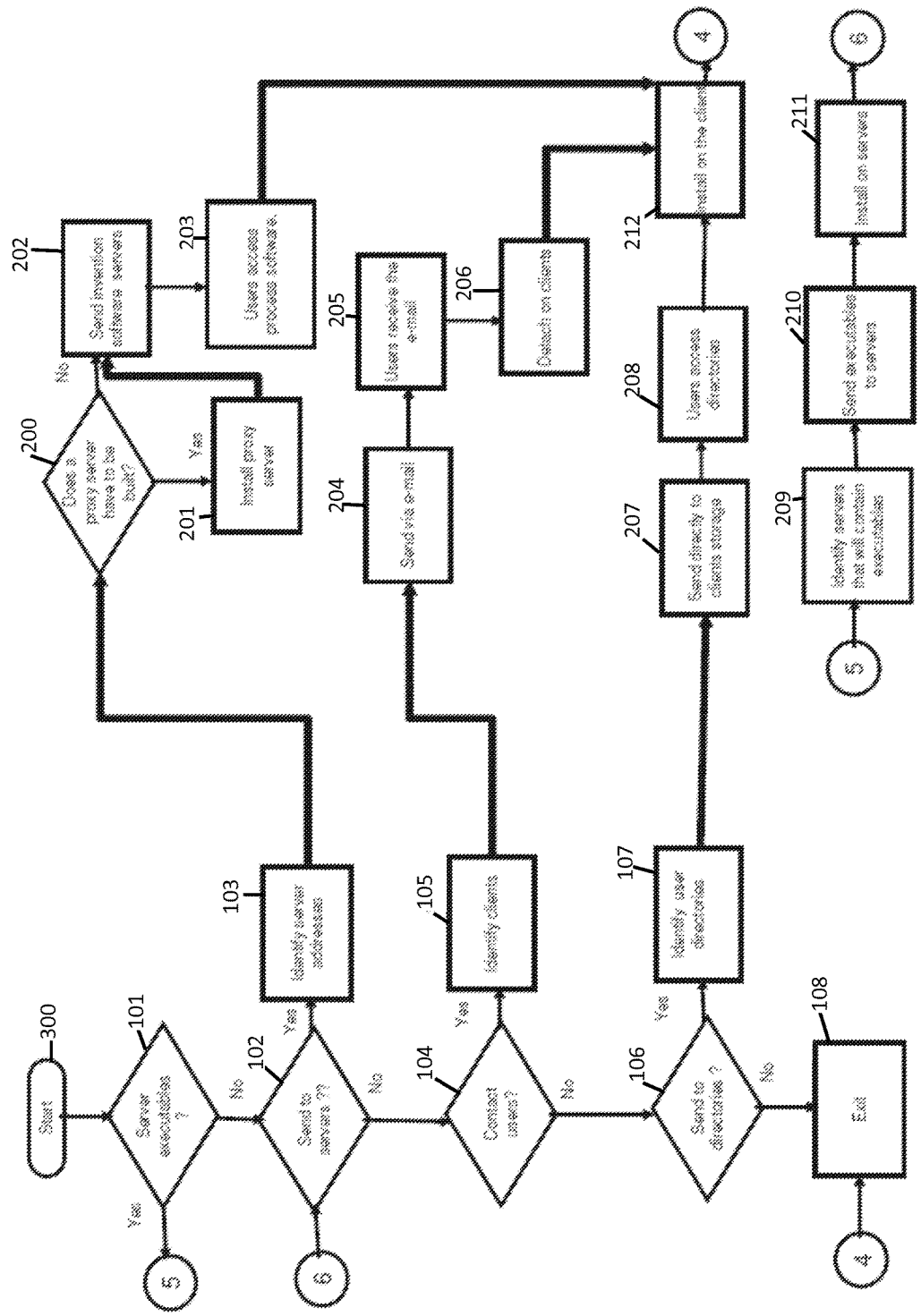
FIG. 4 is a flow diagram illustrating a deployment process for the computer program product of FIG. 3 in accordance with embodiments.

In accordance with embodiments and, with reference to FIG. 4, a deployment process of the computer program product described above is provided. The process begins at block 300 and at block 101 with a determination of whether the first-seventh program instructions 111-117 will reside on the servers 15 when executed. If so, then the servers 15 that will contain the executables are identified at block 209. The first-seventh program instructions 111-117 for the servers 15 are then transferred directly to the servers' storage via FTP or some other protocol or by copying though the use of a shared file system at block 210 such that the first-seventh program instructions 111-117 are installed on the servers 15 at block 211.

Next, a determination is made on whether the first-seventh program instructions 111-117 are to be deployed by having users access the first-seventh program instructions 111-117 on servers 15 at block 102. If so, the server addresses that will store the first-seventh program instructions 111-117 are identified at block 103 and a determination is made if a proxy server is to be built at block 200 to store the first-seventh program instructions 111-117. A proxy server is a server that sits between a client application, such as a Web browser, and a real server and operates by intercepting all requests to the real server to see if it can fulfill the requests itself. If not, the proxy server forwards the request to the real server. The two primary benefits of a proxy server are to improve performance and to filter requests.

If a proxy server is required, then the proxy server is installed at block 201 and the first-seventh program instructions 111-117 are sent to the servers 15 via a protocol, such as FTP, or by being copied directly from the source files to the server files via file sharing at block 202. Another embodiment involves sending a transaction to the (one or more) servers that contained the process software, and have the server process the transaction and then receive and copy the process software to the server's file system. Once the process software is stored at the servers, the users may then access the first-seventh program instructions 111-117 on the servers 15 and copy to the same to their respective client computer file systems at block 203. Alternatively, the servers 16 may automatically copy the first-seventh program instructions 111-117 to each client and then run an installation program for the fir first-seventh program instructions 111-117 at each client computer whereby the user executes the program that installs the first-seventh program instructions 111-117 on his client computer at block 212 and then exits the process at block 108.

At block 104, a determination is made as to whether the first-seventh program instructions 111-117 are to be deployed by sending the first-seventh program instructions 111-117 to users via e-mail. If a result of the determination is affirmative, the set of users where the first-seventh program instructions 111-117 will be deployed are identified together with the addresses of the user client computers at block 105 and the first-seventh program instructions 111-117 are sent via e-mail to each of the users' client computers. The users then receive the e-mail at block 205 and then detach the first-seventh program instructions 111-117 from the e-mail to a directory on their client computers at block 206. The user executes the program that installs the first-seventh program instructions 111-117 on his client computer at block 212 and then exits the process at block 108.

Lastly, a determination is made on whether the first-seventh program instructions 111-117 will be sent directly to user directories on their client computers at block 106. If so, the user directories are identified at block 107 and the process software is transferred directly to the user's client computer directories at block 207. This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the first-seventh program instructions 111-117 at block 208, execute the program that installs the first-seventh program instructions 111-117 at block 212 and then exit the process at block 108.

With reference to FIG. 5, a method for selecting key performance indicators is provided. The method includes determining from historical data which anomaly detectors are associated with key performance indicators (KPIs) for identifying an anomalous event in a first metric group at block 501, extracting descriptors of the metric group from the KPIs to create a first anomaly detector feature profile thereof at block 502, repeating the determining and the extracting with respect to historical data of second and third metric groups to create second and third anomaly detector feature profiles thereof, respectively, at block 503, and ascertaining which of the second and third anomaly detector feature profiles has a greater correlation to the first anomaly detector feature profile at block 504. The method further includes ranking the second and third anomaly detector feature profiles based on which one has the greater correlation and comparing the higher ranked one to future metrics in current or subsequent environments to determine if specific KPIs are likely to produce or be usable in the identification of anomalies at block 505.

A potential use of the computer program product and the method described above would, in some cases, be to generate point tooling or "data mediation tooling" at potential data sources and databases and, for time-series data stored therein, to analyze the time-series data and to present ranked lists to users for inclusion or exclusion with respect to downstream analysis. As noted above, aspects of the disclosure can be automated whereby, for example, only time-series data scoring above a certain level might be flagged for subsequent inclusion in downstream analysis. Moreover, users will have an opportunity to adjust weighting values assigned to various factors and to build upon those supplied by a pre-existing development team. For example, the user may decide that particular time-series data very directly measures key customer experience aspects and are more important to include in downstream analytics then the corresponding score might otherwise indicate. Here, an example of a binary score would be if the time-series is directly associated with customer experience measurements (e.g., it is a well-known metric type) it may automatically be scored/flagged for inclusion based upon the best practice.

Advantages associated with the computer program product and method described above include, but are not limited to, the fact that the features described herein can work without explicit notions of 'best-practices' or pre-existing lists of metrics since important factors that are generally included in the creation of such best-practices or lists are codified within the time series scoring mechanisms. Thus, from day 1 of a product deployment, data selection can be explicitly facilitated and can deal with vagaries of a particular environment (i.e., where a metric type X, based upon observation and analysis, is determined to be acceptable in one environment but would not be in another). In addition, administrators or users of the computer program product and method will be able to select the top-N sets of the time-series data and have confidence that the set is a "best" fit for a given case.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for selecting key performance indicators, the computer program product comprising a computer readable storage medium having program instructions embodied therewith, the program instructions being readable and executable by a processing circuit to cause the processing circuit to:
   determine from historical data which anomaly detectors are associated with key performance indicators (KPIs) for identifying an anomalous event in a first metric group related to central processing unit (CPU) utilization in a first computing system, wherein the anomaly detectors comprise two or more of:
      a Gaussian detector, which generates an alarm when the historical data exhibits a predefined deviation;
      a flat line detector, which generates an alarm when the historical data remains at a same value for a predefined time;
      an increased variance detector, which generates an alarm when the historical data exhibits an increased variance from a baseline value;
      a de-correlation detector, which generates an alarm when the historical data exhibits a de-correlation from other data;
      a top out detector, which generates an alarm when the historical data achieves a maximum value from which the historical data does not recede;
      a bottom out detector, which generates an alarm when the historical data achieves a minimum value from which the historical data does not recede; and
      stop and start reporting detectors, which respectively generate alarm when historical data reporting that is normally online or offline goes offline or online;
   extract descriptors of the first metric group from the KPIs to create a first anomaly detector feature profile thereof;
   repeat the determining and the extracting with respect to historical data of second and third metric groups, which are unrelated or indirectly related to the CPU utilization in the first computing system of the first metric group, to create second and third anomaly detector feature profiles thereof, respectively;
   ascertain which of the second and third anomaly detector feature profiles has a greater correlation to the first anomaly detector feature profile; and
   rank the second and third anomaly detector feature profiles based on which one has the greater correlation and compare the higher ranked one to future metrics in current or subsequent environments to determine if specific KPIs are likely to produce anomalies.

2. The computer program product according to claim 1, wherein the first metric group is embodied in a first computing system and the second and third metric groups are embodied in a second computing system.

3. The computer program product according to claim 1, wherein the first, second and third metric groups respectively comprise time-series data obtained from different hosts in a distributed environment.

4. The computer program product according to claim 1, wherein the program instructions further cause the processing circuit to deploy the one of the second and third metric groups whose anomaly detector feature profile has a greater correlation to the first anomaly detector feature profile.

5. The computer program product according to claim 4, wherein the program instructions further cause the processing circuit to update the first anomaly detector feature profile.

6. The computer program product according to claim 4, wherein the program instructions further cause the processing circuit to update the first anomaly detector feature profile based on a performance of the deployed one of the second and third metric groups.

7. A computer system for selecting key performance indicators, the computer system comprising a computer readable storage medium having instructions stored thereon that are executable by a processing circuit to cause the processing circuit to:
   determine from historical data which anomaly detectors are associated with key performance indicators (KPIs) for identifying an anomalous event in a first metric group related to central processing unit (CPU) utilization in a first computing system, wherein the anomaly detectors comprise two or more of:
      a Gaussian detector, which generates an alarm when the historical data exhibits a predefined deviation;
      a flat line detector, which generates an alarm when the historical data remains at a same value for a predefined time;
      an increased variance detector, which generates an alarm when the historical data exhibits an increased variance from a baseline value;
      a de-correlation detector, which generates an alarm when the historical data exhibits a de-correlation from other data;
      a top out detector, which generates an alarm when the historical data achieves a maximum value from which the historical data does not recede;
      a bottom out detector, which generates an alarm when the historical data achieves a minimum value from which the historical data does not recede; and
      stop and start reporting detectors, which respectively generate alarm when historical data reporting that is normally online or offline goes offline or online;
   extract descriptors of the first metric group from the KPIs to create a first anomaly detector feature profile thereof;
   repeat the determining and the extracting with respect to historical data of second and third metric groups, which are unrelated or indirectly related to the CPU utilization in the first computing system of the first metric group, to create second and third anomaly detector feature profiles thereof, respectively;

ascertain which of the second and third anomaly detector feature profiles has a greater correlation to the first anomaly detector feature profile; and rank the second and third anomaly detector feature profiles based on which one has the greater correlation and compare the higher ranked one to future metrics in current or subsequent environments to determine if specific KPIs are likely to produce anomalies.

8. The system according to claim 7, wherein the first metric group is embodied in a first computing system and the second and third metric groups are embodied in a second computing system.

9. The system according to claim 7, wherein the first, second and third metric groups respectively comprise time-series data obtained from different hosts in a distributed environment.

10. The system according to claim 7, wherein the instructions cause the processing circuit to deploy the one of the second and third metric groups whose anomaly detector feature profile has a greater correlation to the first feature profile.

11. The system according to claim 10, wherein the instructions cause the processing circuit to update the first anomaly detector feature profile.

12. The system according to claim 10, wherein the instructions cause the processing circuit to update the first anomaly detector feature profile based on a performance of the deployed one of the second and third metric groups.

13. A computer-implemented method for selecting key performance indicators, comprising:
   determining from historical data which anomaly detectors are associated with key performance indicators (KPIs) for identifying an anomalous event in a first metric group related to central processing unit (CPU) utilization in a first computing system, wherein the anomaly detectors comprise two or more of:
      a Gaussian detector, which generates an alarm when the historical data exhibits a predefined deviation;
      a flat line detector, which generates an alarm when the historical data remains at a same value for a predefined time;
      an increased variance detector, which generates an alarm when the historical data exhibits an increased variance from a baseline value;
      a de-correlation detector, which generates an alarm when the historical data exhibits a de-correlation from other data;
      a top out detector, which generates an alarm when the historical data achieves a maximum value from which the historical data does not recede;
      a bottom out detector, which generates an alarm when the historical data achieves a minimum value from which the historical data does not recede; and
      stop and start reporting detectors, which respectively generate alarm when historical data reporting that is normally online or offline goes offline or online;
   extracting descriptors of the first metric group from the KPIs to create a first anomaly detector feature profile thereof;
   repeating the determining and the extracting with respect to historical data of second and third metric groups, which are unrelated or indirectly related to the CPU utilization in the first computing system of the first metric group, to create second and third anomaly detector feature profiles thereof, respectively;
   ascertaining which of the second and third anomaly detector feature profiles has a greater correlation to the first anomaly detector feature profile; and
   ranking the second and third anomaly detector feature profiles based on which one has the greater correlation and comparing the higher ranked one to future metrics in current or subsequent environments to determine if specific KPIs are likely to produce anomalies.

14. The computer-implemented method according to claim 13, wherein the first metric group is embodied in a first computing system and the second and third metric groups are embodied in a second computing system.

15. The computer-implemented method according to claim 13, wherein the first, second and third metric groups respectively comprise time-series data obtained from different hosts in a distributed environment.

16. The computer-implemented method according to claim 13, further comprising presenting for deployment the one of the second and third metric groups whose anomaly detector feature profile has a greater correlation to the first anomaly detector feature profile.

17. The computer-implemented method according to claim 16, further comprising updating the first anomaly detector feature profile based on a performance of the deployed one of the second and third metric groups.

* * * * *